United States Patent
Becker et al.

(10) Patent No.: US 7,760,832 B2
(45) Date of Patent: Jul. 20, 2010

(54) ARRANGEMENT AND METHOD FOR SYNCHRONIZING A SIGNAL PROCESSING DEVICE WITH AN INCOMING SIGNAL

(75) Inventors: Burkhard Becker, Ismaning (DE); Robert Denk, Grafing (DE); Berndt Pilgram, München (DE); Dietmar Wenzel, München (DE); Robert Würth, München (DE)

(73) Assignee: Infineon Technologies AG, Munich (DE)

( * ) Notice: Subject to any disclaimer, the term of this patent is extended or adjusted under 35 U.S.C. 154(b) by 918 days.

(21) Appl. No.: 10/543,937

(22) PCT Filed: Dec. 18, 2003

(86) PCT No.: PCT/EP03/14526

§ 371 (c)(1),
(2), (4) Date: Jun. 5, 2006

(87) PCT Pub. No.: WO2004/068741

PCT Pub. Date: Aug. 12, 2004

(65) Prior Publication Data

US 2007/0110106 A1    May 17, 2007

(30) Foreign Application Priority Data

Jan. 31, 2003    (DE) ................ 103 03 917

(51) Int. Cl.
*H04L 7/00* (2006.01)
(52) U.S. Cl. ............. 375/354; 375/373; 375/326; 375/355; 370/503
(58) Field of Classification Search ........... 375/354
See application file for complete search history.

(56) References Cited

U.S. PATENT DOCUMENTS

| 4,742,546 | A | * | 5/1988 | Nishimura ............... 380/35 |
| 5,390,216 | A | | 2/1995 | Bilitza et al. |
| 5,832,029 | A | * | 11/1998 | Mimura ............... 375/149 |
| 5,990,978 | A | * | 11/1999 | Kim et al. ............... 348/663 |
| 6,154,506 | A | * | 11/2000 | Ishikawa et al. ......... 375/326 |
| 6,278,699 | B1 | | 8/2001 | Atarius |
| 6,721,292 | B1 | | 4/2004 | Ritter et al. |
| 7,012,983 | B2 | * | 3/2006 | Buchwald et al. ......... 375/373 |
| 7,369,577 | B2 | * | 5/2008 | Darbel et al. ........... 370/503 |

FOREIGN PATENT DOCUMENTS

| EP | 1 259 006 A2 | 11/2002 |
| WO | WO 98/58463 A1 | 12/1998 |
| WO | WO 99/31817 A1 | 6/1999 |

* cited by examiner

*Primary Examiner*—Shuwang Liu
*Assistant Examiner*—Lihong Yu
(74) *Attorney, Agent, or Firm*—Maginot, Moore & Beck

(57) ABSTRACT

An arrangement and a method for synchronizing a signal processing apparatus with a received signal which has a characteristic signal content are disclosed. The arrangement has a first control loop which readjusts the signal processing apparatus with respect to the characteristic signal content on a content basis, and a second control loop which readjusts a flow control device in the signal processing apparatus with respect to the times at which the characteristic signal content appears, the first control loop and the second control loop being coupled such that a unique association is achieved between the position of the characteristic signal content in the received signal and the associated appearance time.

17 Claims, 1 Drawing Sheet

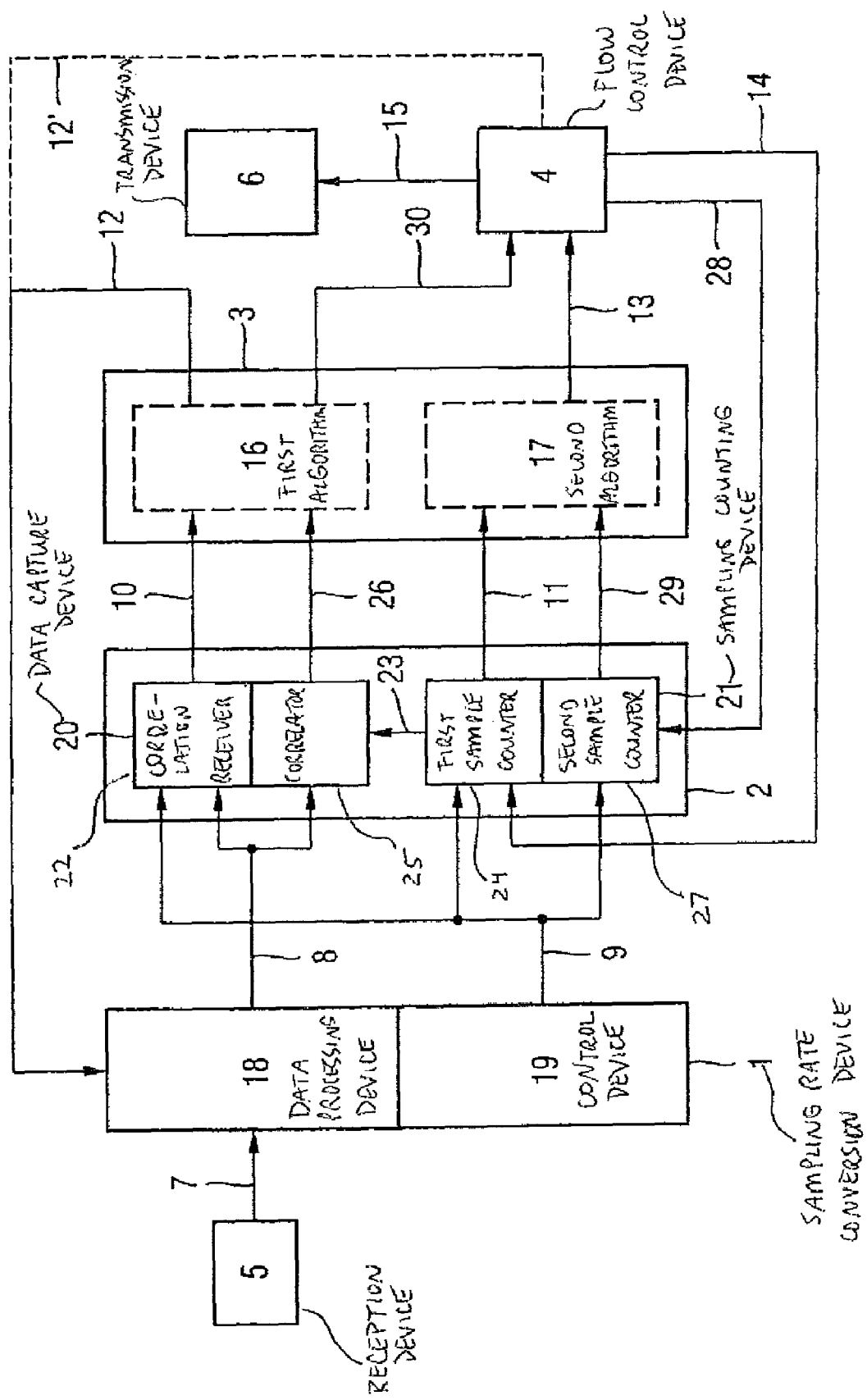

ARRANGEMENT AND METHOD FOR SYNCHRONIZING A SIGNAL PROCESSING DEVICE WITH AN INCOMING SIGNAL

FIELD Of The INVENTION

The present invention relates to an arrangement and a method for synchronizing a signal processing apparatus with a received signal, and particularly to the synchronization of signal processing apparatuses with a received signal on a mobile station in a radio telecommunication system.

BACKGROUND

This description uses the terms defined below.

The term "sampling frequency" describes the clock frequency at which a digital/analog converter (DAC) or an analog/digital converter (ADC) is operated or would need to be operated in order to convert a signal from the digital domain into the analog domain or from the analog domain into the digital domain.

The term "sampling rate" describes the number of samples in a discrete-time signal per unit time, averaged over a defined period.

The term "sampling pattern" describes the periodic structure in which samples of a discrete-time signal are arranged at a defined distance on the basis of a freely selectable reference variable (length, time etc.).

A current example of a mobile radio system is the universal mobile telecommunications system (UMTS). The basic architecture of a UMTS mobile radio system contains, inter alia, mobile stations and subscriber terminals (user equipment (UE)) and a radio access network (RAN). The radio access network contains devices for transmitting data by radio and in addition contains, inter alia, base stations which are named at UMTS Node B. The base stations respectively cover a particular area or a cell in which mobile stations may be located.

In a UMTS mobile radio system, digital data to be transmitted are first of all subjected to channel coding in order to provide the digital data with redundancy. The digital data are then distributed over physical channels by a multiple access method within the framework of the available transmission bandwidth. Finally, the digital data are digitally modulated in order to be transmitted via a mobile radio channel. The mobile radio channel is split in terms of time or frequency by a time-division duplex method (TDD) or a frequency-division duplex method (FDD) for a transmission mode and a reception mode.

The channel coding protects the data to be transmitted against incorrect transmission over a mobile radio channel which is subject to interference, or error correction is made possible on the respective receiver of the data.

In the case of UMTS, the multiple access method used is code-division multiple access CDMA, in which the bipolar data bit stream to be transmitted is multiplied and spread by a subscriber-specific bipolar code sequence or a spreading code. The elements of the spreading code are called chips in order to be able to distinguish them semantically from the bits in the data bit stream. Chips are in principle nothing other than bits. Multiplying the data bit stream by a chip stream produces a bipolar data stream again. Generally, the rate of the chip stream is a multiple of the rate of the data bit stream and is determined by the length of the spreading code, i.e. by a "spreading factor" (SF). The data stream produced by the correct-phase multiplication is therefore at the rate of the chip stream. The multiple access method is used by all subscribers in order to use a subscriber-specific spreading code to provide their user data with a fingerprint which allows the transmitted signal to be restored from the total of the received signals. In the receiver, the bits of the data bit stream can be recovered from the received chip sequence by repeating the process of multiplication. To this end, the chip stream is again multiplied, using the correct phase, by the same spreading code as has already been used in the transmitter, which again results in the transmitted data bit stream. Various data bit streams which are intended to be transmitted in parallel from the transmitter are multiplied by various, orthogonal spreading codes or code sequences and are then added. The total signal is then also subjected to "scrambling", which is done by multiplying the total signal by a cell-specific or station-specific scrambling code on a chip by chip basis and identifies the cell or the base station.

The time structure of the multiple access is divided into "time frames" of 10 ms each in UMTS mobile radio systems. The duration of a transmission frame or time frame (frame) corresponds to the duration of 38 400 chips (76 800 bits), and the modulation rate is 3.84 Mchips/s. Each time frame is divided into 15 time slots (slots) of length 666 µs, which correspond exactly to the duration of 2560 chips. The chip duration is approximately 0.2604 µs.

The mobile radio channel is characterized by multipath propagation (reflection, diffraction, refraction etc.) of the transmitted signals, time dispersion and Doppler distortion. A radio signal emitted by a transmitter, e.g. a base station, can reach a receiver, e.g. a mobile station, often on a plurality of different propagation paths which differ from one another in terms of different propagation times, phases and intensities. To restore a transmitted signal from a received signal compiled by superimposing signals transmitted on the various propagation paths, said transmitted signal is conditioned using a RAKE receiver in the mobile station or in the base station. The RAKE receiver has fingers which are each associated with a propagation path for a signal and are operated with a sampling delay which compensates for the propagation-time delay of the propagation path in question. Each finger also comprises a correlator which multiplies the time-delayed received signal from a propagation path by a spreading code in order to restore bits from the received signal which the transmitter end has spread using the same spreading code. The output signals from the individual fingers are combined in order to improve the reliability of communication.

In the UMTS mobile radio system, a mobile station needs to synchronize its signal processing apparatuses to received signals which it receives from the surrounding base stations, so as firstly to be able to correctly decode the data which are to be received and so as secondly to be able to generate and transmit transmitted signals, so that said mobile station is in turn understood by the base stations.

When synchronizing a mobile station, individual signal propagation paths or base station signals, which are generally represented by correlation maxima, are identified and normally a base station signal is determined as a reference signal and the mobile station orients the timings and signal processing steps as accurately as possible to this reference signal. In the UMTS standard, an observation interval or observation window is defined around this reference signal and is used to search for further signal propagation paths and also contains all propagation paths which are used for data capture. During synchronization, two problems arise, inter alia, to which the term "synchronization" is linked below.

One problem is that the content of the base station signal or generally of the received signal needs to be analyzed by the mobile station, and characteristic signal contents, e.g. a correlation maximum, needs to be identified. It is therefore necessary to monitor continuously or at particular intervals of time where the characteristic signal contents are located within the received signal and, if their position changes, suitable measures need to be introduced to readjust the mobile station accordingly. If, by way of example, the reference signal moves within the observation window, for example because when a mobile station moves briefly the received signal from this propagation path is compressed in time for this period by the Doppler effect, then the observation window needs to be readjusted to the reference signal so as not to lose the reference signal and to keep it in the center of the observation window.

A further problem is that a timing control device within the mobile station needs to be synchronized to the times at which these characteristic signal contents appear, i.e. to the changed, faster or shifted timing, so that the mobile station can trigger events at defined times relative to the received signal, e.g. can transmit signal contents, in particular. By way of example, the UMTS standard defines for mobile stations that a transmission frame for the transmitted signal starts 1024 chips after the start of a transmission frame in a received signal, specifically with a tolerance of just 1.5 chips (corresponding to approximately 0.39 µs). The mobile station's flow control device thus needs to have its timing readjusted to the appearance of the characteristic signal contents in the received signal.

It should be pointed out that a command on a higher protocol layer can prompt a change of reference signal or of reference base station. In this case, a base station other than the original base station becomes the new reference base station. In this context, the mobile station is instructed to place the center of its observation window on another new propagation path or on another new base station.

One property which is important for synchronizing mobile stations in UMTS mobile radio systems is that apart from a few exceptions, e.g. compressed mode, in which transmission breaks are provided in a time frame, only continuous-time signals are received and transmitted. This has the associated difficulty that readjusting a mobile station with respect to the received characteristic signal content and accordingly also readjusting the flow control device cannot be done abruptly, since otherwise signal contents are skipped or gaps are produced, which inevitably results in errors in the signal evaluation. The readjustment of the mobile station with respect to the received signal, both in terms of content and in terms of time, thus likewise needs to be done continuously or at least in such small steps that there is not yet any significant impairment of evaluation of the signal. In contrast, GSM/EDGE (Global System for Mobile communication/Enhanced Data rates for GSM Evolution) systems involve the performance of a "burst transmission", in which breaks in transmission and reception periodically arise which can be used for simple abrupt readjustment. For the synchronization with the characteristic signal contents and for the time synchronization, the UMTS standard prescribes the following conditions:

The mobile station needs to be readjusted up to a stipulated maximum permissible error, which defines the resolution of the control. In addition, there is an upper limit for a control error.

The control error must be compensated for within a particular time, e.g. the duration of a transmission frame (10 ms). This stipulates a minimum speed for the readjustment. The maximum timing error for a mobile station is determined by the delay time between the appearance of a control error and the correction of a control error.

When readjusting a transmitted signal transmission time stipulated by the flow control device, which is in turn readjusted to the received signal, it is not possible to exceed a maximum permitted change speed, e.g. ¼ chip in 200 ms. For this reason, the change speed used to readjust the timing control device is likewise subject to this stipulation.

In line with the UMTS standard, characteristic signal contents should be identified with at least an accuracy of half a chip period, and the same accuracy should be used to readjust the mobile station.

In line with the UMTS standard, the UMTS mobile station's flow control device should be able to be set at least with an accuracy of half a chip period and should be able to be readjusted to the characteristic signal content of the received signal with the same accuracy.

A further constraint when synchronizing mobile stations in the UMTS radio telecommunication system is that the mobile station's available operating clock for the signal processing devices and for the flow control device is frequently not at a frequency which is an integer multiple of the UMTS typical chip frequency of 3.84 MHz, but rather is derived from a GSM-typical clock (e.g. 13 or 26 MHz), for example. It is thus not possible to map UMTS events onto the operating clock with precision timing.

Known arrangements and methods for synchronizing mobile stations in the UMTS radio telecommunication system operate on the basis of the principle of inserting individual samples into the received or transmitted signal or removing individual samples from the received or transmitted signal for the purpose of readjustment and synchronization.

One drawback of these arrangements and methods is that they require the signal normally to be at or to be processed at a sampling frequency which is several times higher in comparison with the sampling theorem in order to obtain sufficiently fine resolution. This normally requires increased circuit, memory and/or computation complexity.

A further drawback of these arrangements and methods is that the number of samples per transmission frame or time slot is not constant, which results in problems with multiplying the signal by scrambling and spreading codes, for example, and therefore requires special consideration.

SUMMARY

The object of the present invention is to produce an arrangement and a method for synchronizing a signal processing apparatus with a received signal which allow low-complexity synchronization of signal processing apparatuses.

The idea underlying the present invention is to use two independently operating control loops which allow separate synchronization with respect to the characteristic signal content and with respect to a flow control device and are coupled by means of a signal processing device, particularly a sampling rate conversion device, which is used jointly for both control loops or controllers, so that a unique association is achieved between the location at which characteristic signal contents appear in the received signal and the associated time of the appearance, and also to use independent data capture devices and sample counting devices which provide information both about the position in terms of locality and about the position in terms of time.

The invention provides an arrangement for synchronizing a signal processing apparatus with a received signal which has a characteristic signal content, having a first control loop, which readjusts the signal processing apparatus with respect to the characteristic signal content on a content basis, and a second control loop, which readjusts a flow control device in the signal processing apparatus with respect to the times at which the characteristic signal content appears, the first control loop and the second control loop being coupled such that a unique association is achieved between the position of the characteristic signal content in the received signal and the associated appearance time.

The invention also provides a method for synchronizing a signal processing apparatus with a received signal which has a characteristic signal content, having the following steps: the signal processing apparatus is readjusted with respect to the characteristic signal content on a content basis, a flow control device in the signal processing apparatus is readjusted with respect to the times at which the characteristic signal content appears, and the steps of content-based readjustment and of readjusting the flow control device are coupled such that a unique association is achieved between the position of the characteristic signal content in the received signal and the associated appearance time.

In line with one preferred development of the arrangement of the present invention, the received signal has samples which are arranged at a particular distance from one another, and the first control loop and the second control loop are coupled via a sampling rate conversion device which changes the distance between the samples in the received signal on the basis of a conversion ratio.

In line with a further preferred development of the arrangement, the first control loop detects the characteristic signal content in the converted received signal, determines a positional error between the position of the characteristic signal content and a reference position, and controls the conversion ratio of the sampling rate conversion device on the basis of the positional error in order to match the position of the characteristic signal content to the reference position.

In line with a further preferred development of the arrangement, the sampling rate conversion device indicates appearance times for the samples in the converted received signal, and the second control loop detects the indicated appearance times, ascertains the reference position and a time reference from the detected appearance times, determines a timing error between the time reference and a piece of time information which is generated by the flow control device in the signal processing apparatus, and controls the flow control device on the basis of the timing error in order to match the flow control device to the time reference.

In line with a further preferred development of the arrangement, the first control loop has a data capture device and a computation device.

In line with a further preferred development of the arrangement, the data capture device has a correlation receiver which detects a correlation maximum within data channels.

In line with a further preferred development of the arrangement, the data capture device also has a correlator which detects synchronization information for various propagation paths for the received signal or transmission stations.

In line with a further preferred development of the arrangement, the second control loop has a sample counting device and the computation device.

In line with a further preferred development of the arrangement, the sample counting device has a first sample counter, which counts the frequency with which the samples in the converted received signal appear within a transmission frame, and a second sample counter, which detects the position in time at which the samples appear with respect to an operating clock.

In line with a further preferred development of the arrangement, the time information indicates the appearance of a sample and/or of a particular number of samples.

In line with a further preferred development of the arrangement, the reference position is the center point of a time observation window, and the signal processing apparatus is readjusted in order to keep the characteristic signal content in the center of the time observation window.

In line with a further preferred development of the arrangement, the data capture device and the sample counting device average the results therefrom.

In line with a further preferred development of the arrangement, the arrangement is used in a UMTS mobile station.

In line with one preferred development of the method of the present invention, the received signal is based on samples which are arranged at a particular distance from one another, and the step of coupling comprises the step of changing the distance between the samples in the received signal on the basis of a conversion ratio.

In line with a further preferred development of the method, the step of content-based readjustment comprises the following steps: the characteristic signal content in the converted received signal is detected, a positional error between the position of the characteristic signal content and a reference position is determined, and the conversion ratio is controlled on the basis of the positional error in order to match the position of the characteristic signal content to the reference position.

In line with a further preferred development of the method, the times at which the samples appear in the converted received signal are indicated, and the step of readjusting the flow control device comprises the following steps: the indicated appearance times are detected, the reference position and a time reference are ascertained from the detected appearance times, a timing error between the time reference and a piece of time information which is generated by the flow control device in the signal processing apparatus is determined, and the flow control device is controlled on the basis of the timing error in order to match the flow control device to the time reference.

In line with a further preferred development of the method, the steps of content-based readjustment of the signal processing apparatus with respect to the characteristic signal content and of readjusting the flow control device in the signal processing apparatus with respect to the appearance times for the characteristic signal content involve the detected and determined values being averaged.

One advantage of the present invention is that the readjustment and synchronization take place such that no signal contents in the received or transmitted signal are missing or skipped.

A further advantage of the present invention is that for the purposes of readjustment or synchronization no samples are inserted into the received or transmitted signal or removed from the received or transmitted signal, in particular.

A further advantage of the present invention is that the number of samples which is removed from the received signal or calculated for the transmitted signal for processing a transmission frame or time slot is always constant, regardless of whether or not a synchronization or readjustment operation is currently taking place.

A further advantage of the present invention is that a variable fractional sampling rate conversion device is used in order to perform time compression or expansion for signal contents. The operating clock for the arrangement can therefore be based on a different frequency than the frequency of the UMTS mobile radio system. This is particularly advantageous if the mobile station supports a plurality of mobile radio standards, for example UMTS and GSM/EDGE.

A further advantage of the present invention is that a "synchronous design" for a circuit in the arrangement is possible, since digital circuit components can operate at a constant independent physical operating clock.

A further advantage of the present invention is that the combination of improved resolution both in a data path and in a time reference path in combination with high resolution in the flow control device allows time adjustment for the overall arrangement with an accuracy of one eighth of a chip period, for example, this accuracy being better than the accuracy of half a chip period which is demanded by the UMTS standard.

A further advantage of the present invention is that the data capture device and the sample counting device average the results therefrom or that the detected and determined values are averaged, for example during the steps of detecting the characteristic signal content in the converted received signal, determining a positional error between the position of the characteristic signal content and a reference position, detecting the indicated appearance times and determining a timing error between the time reference and a piece of time information which is generated by the flow control device in the signal processing apparatus. This reduces the computation loading in the computation device.

Preferred exemplary embodiments of the present invention are explained in more detail below with reference to the appended drawing.

BRIEF DESCRIPTION OF THE DRAWINGS

FIG. 1 shows exemplary embodiments of an arrangement for synchronizing a signal processing apparatus with a received signal in line with the present invention.

DETAILED DESCRIPTION

FIG. 1 shows exemplary embodiments of an arrangement for synchronizing a signal processing apparatus with a received signal in line with the present invention. The arrangement has a sampling rate conversion device 1, an evaluation device 2, a computation device 3 and a flow control device 4. The sampling rate conversion device 1 is connected to a reception device 5, and the flow control device 4 is connected to a transmission device 6.

The sampling rate conversion device 1 variably converts the sampling rate of samples of a digital received signal 7 which are supplied by the reception device 5 and produces an output signal 8, whose samples may have a different sampling pattern, for the evaluation device 2 and a validity signal 9 which indicates to the evaluation device 2 whenever there is a new valid sample which it can accept. The sampling rate conversion device may, in general terms, be a signal processing device which changes the distance between sections of information, such as samples, in a signal received by a reception device.

The evaluation device 2 is used to detect and evaluate characteristic signal contents in the converted received signal 7 or in the output signal 8 from the sampling rate conversion device 1 and to generate a first control error signal 10 and a second control error signal 11. The first control error signal 10 contains the control errors for the synchronization with a base station which is determined as the reference base station, and indicates the relative change in the position of a particular characteristic signal content, e.g. of a correlation maximum for a physical channel in the reference base station, in comparison with an internal reference. The second control error signal 11 contains the control errors for the synchronization of the flow control device within the mobile station.

The computation device 3 is preferably a digital signal processor (DSP) or a microprocessor and is used to process at least the first control error signal 10 and the second control error signal 11 from the evaluation device 2 and to generate therefrom at least one sampling rate control signal 12, which is supplied to the variable sampling rate conversion device 1, and a time control signal 13 which contains time control information and which is supplied to the flow control device 4. The sampling rate control signal 12 from the computation device 3 is used to program the conversion ratio of the sampling rate conversion device 1 at the correct time. The sampling rate conversion device 1 can raise or lower its conversion ratio on the basis of the sampling rate control signal 12 or can leave it at a standard value. The time control signal 13 from the computation device 3 is used to correct the timing of the flow control device 4.

The flow control device 4 processes the time control signal 13 from the computation device 3 and generates at least one first synchronization signal 14 which is supplied to the evaluation device 2. The first synchronization signal 14 from the flow control device 4 indicates a "start of reception frame" and marks the time at which a transmission frame starts from the point of view of the flow control device 4. The flow control device 4 also generates a transmission synchronization signal 15, preferably periodically, i.e. at a fixed interval of time, which controls the mobile station's transmission time or the "start of transmission frame".

The computation device 3 takes the first control error signal 10 from the evaluation device 2 and uses a first, "base station tracking" algorithm 16 to calculate the sampling rate control signal 12 for the sampling rate conversion device 1. The computation device 3 also takes the second control error signal 11 from the evaluation device, which signal contains information about the first synchronization signal 14, and preferably uses a second, "mobile station timing" algorithm 17 to calculate the time control signal 13 for readjusting the timing of the flow control device 4.

The sampling rate conversion device 1 has a data processing device 18 and a control device 19. The data processing device 18 is used to process the samples of the received signal 7 and to generate the output signal 8 with a converted sampling rate. The control device 19 is connected to the data processing device 18 and is used to generate the validity signal 9 from the sampling rate conversion device 1.

The evaluation device 2 has a data capture device 20 and a sample counting device 21. The data capture device 20 is used to capture the transmitted data and to generate the first control error signal 10. To this end, the data capture device 20 preferably has a correlation receiver 22, such as a RAKE receiver with an upstream time variant interpolator (TVI), for capturing the transmitted data, to which the output signal 8 from the sampling rate conversion device 1 is supplied. The sample counting device 21 is used to count the appearance of the validity signal 9 from the sampling rate conversion device 1, which signal indicates to the evaluation device 2 when there is a new valid sample. The sample counting device 21 counts the samples which have been processed by the data capture device 20 since a transmission frame last started, and generates an indicator signal 23 which preferably signals the respective sequence of 76 800 samples, which correspond to one transmission frame in a UMTS mobile radio system (when sampling at double chip rate). This allows exact timing association for the received data within the data capture device 20. The sample counting device 21 is also used to generate the second control error signal 11. To this end, the sample counting device 21 preferably has a first sample counter 24 at the reception end.

The first control error signal 10 indicates the relative change in the position of a particilar characteristic signal content, e.g. of a correlation maximum on a physical data channel for the reference base station, in comparison with an internal reference which is generated from the indicator signal 23 from the sample counting device is represented by said signal. The relative change is expressed by the first control error signal 10 using a number of samples. This first control error signal 10 is preferably generated by the data capture device 20 by supplying the relative shifts in propagation paths using a correlation result. The sample counting device 20 identifies the samples in the data capture device 20 and thus produces a temporal relationship between a particular characteristic signal content and the mobile station's internal time reference, which is supplied by the flow controller 4.

The second control error signal 11 indicates the relative position of the start of reception frame from the point of view of the flow control device 4, said start being signaled by the first synchronization signal 14 from the flow control device 4, in relation to the actual star of reception frame, which is obtained from the counter reading on the sample counting device 21 and is preferably signaled by the indicator signal 23. The relative position or the control error is expressed in the second control error signal 11 from the evaluation device 2 by the number of samples situated between the start of the transmission frame and the actual start of the transmission frame in the received signal. When the first synchronization signal 14, which indicates the "start of reception frame", appears the counter reading on the sample counting device 21 is stored. This counter reading is a measure of the timing error for events which are triggered by the flow control device 4 in relation to the sample counting device 21.

Each sample of the output signal 8 from the sampling rate conversion device 1 respectively represents precisely one signal portion of the received signal 7 of a particular duration, for example of half a chip (approximately 130 ns). Only the frequency with which the samples of the output signal 8 are output, particularly the frequency of appearance of the validity signal 9, determines the data throughput through the evaluation device 2. Hence, if the sampling rate conversion device 1 outputs more samples than average, the average processing speed of the evaluation device 2 rises accordingly.

The text below gives a further description with reference to FIG. 1 of how, in a further exemplary embodiment, the time resolution of the arrangement can be increased and the evaluation can be improved both in the data path and in the time reference path.

To this end, the data capture device 20 in the evaluation device 2 also preferably has a correlator 25, such as a matched filter or a searcher, for detecting the physical synchronization channels and for searching for propagation paths, said correlator likewise being supplied with the output signal 8 from the sampling rate conversion device 1. The correlator 25 generates a third control error signal 26 from the evaluation device 2, said signal likewise being supplied to the computation device 3. The third control error signal 26 from the evaluation device 2 uses a lower resolution than the first control error signal 10 to indicate the relative position of a particular characteristic signal content which is associated, in particular, with the same propagation path and with the same base station as the characteristic signal content to which the first control error signal 10 relates, specifically relative to the start of a transmission frame, expressed by the number of samples situated between the start of the transmission frame and appearance of the characteristic signal content. The correlator 25 determines the positions of propagation paths relative to a start marker, preferably to an accuracy of one sample.

The sample counting device 21 in the evaluation device 2 preferably also has a second sample counter 27 at the reception end. In this case, the first sample counter 24 and the second sample counter 27 may be associated both with the correlation receiver 22 and with the correlator 25.

The flow control device 4 also preferably generates a second synchronization signal 28, which indicates the "sample position" (pointer of the second sample counter 27) and marks, from the point of view of the flow control device 4, the time at which the sample rate conversion device 1 outputs an arbitrary but clearly determinable sample of the output signal 8 or activates the associated validity signal 9. The second synchronization signal 28 is supplied to the second sample counter 27.

The second sample counter 27 is preferably operated using a high-frequency operating clock, e.g. approximately 125 MHz, in comparison with the first sample counter 24 and counts the periods in this operating clock which pass between the appearance of the validity signal 9 and the second synchronization signal 28. The count obtained is a measure of the timing error between events generated by the flow control device 4 and their associated characteristic signal contents, i.e. the timing error between the second synchronization signal 28, which indicates the "sample position" from the point of view of the flow control device 4, and the actual appearance of the corresponding sample in the received signal, which is signaled by the validity signal 9, measured in periods of the operating clock, e.g. four clock periods of approximately 8 ns each. The counter reading obtained is transmitted to the computation device 3 by the evaluation device 2 as a fourth control error signal 29. The fourth control error signal 29 complements the second control error signal 11, which is generated by the first sample counter 24, and, on account of the finer time resolution, allows even more accurate synchronization, e.g. to fractions of a chip period, of the flow control device 4 to the time at which characteristic signal contents appear.

In one alternative exemplary embodiment, the sampling rate control signal 12' for the sampling rate conversion device 1 is generated by the flow control device 4 in order to relieve the computation device 3 of the load of time-critical tasks as far as possible. To this end, the flow control device 4 is provided beforehand with control information (which is necessary for this purpose) about a control signal 30 by the computation device 3.

The computation device 3 processes the information in the control error signals 10, 11, 26 and 29 and generates therefrom firstly the time control signal 13 for correcting the timing of the flow control device 4 and secondly the control signal 30 for generating the sampling rate control signal 12' using the flow control device 4 in order to program the conversion ratio for the sampling rate conversion device 1 at the correct time. The computation device 3 preferably uses the first, "base station tracking" algorithm 16, which is used for readjusting the mobile station to characteristic signal contents, to generate the control signal 30 from the first control error signal 10 and the third control error signal 26 and uses the second, "mobile station timing" algorithm 17, which is used for readjusting the timing of the flow control device 4 to the appearance of characteristic signal contents, to generate the time control signal 13 from the second control error signal 11 and the fourth control error signal 29. Alternatively, a respective separate computation device may be provided for executing the first algorithm 16 and the second algorithm 17, said computation device processing the signals from the data capture device 20 or from the sample counting device 21.

The inventive arrangement implements two or alternatively four mutually independent control loops which can be classified into two groups (A, B): control loops for readjustment with respect to characteristic signal contents (A) and control loops for readjusting timing (B). The control aims of the control loops are advantageously implemented independently of one another. For each control aim, there is a respective output signal from the evaluation device 2 or information for coarse control (2) and fine control (1). In the steady state, advantageously only the fine control (1) is active generally, since only small errors need to be corrected. In the text below, the 4 control loops are:

A1: 22->10->3, 16->30->4->12'->1->8->20

This is a control loop for signal contents which has sub-sample accuracy, i.e. finer time resolution than the samples, with the control aim of keeping a selected characteristic signal content in the center of a defined observation window with at least the accuracy of one eighth of a chip. As control element, the control signal 30 is used to reprogram the sampling rate ratio.

A2: 25->26->3, 16->30->4->12'->1->8->25

This is a control loop for signal contents which has sampling rate accuracy with the control aim of keeping a selected characteristic signal content in the center of a defined observation window with the accuracy of one half of a chip. As control element, the control signal 30 is used to reprogram the sampling rate ratio.

B1: 27->29->3, 17->13->4->12'->1->9->27

This is a control loop for time readjustment having sub-sample accuracy with the control aim of readjusting the flow control device 4 such that the pointer of the second sample counter 27 points as exactly as possible to a particular selected sample and hence a unique association between sample number and time is always assured. As control element, the time control signal 13 is used to reprogram the time offset for the flow control device 4.

B2: 24->11->3, 17->13->4->12'->1->9->24

This is a control loop for time readjustment having sample accuracy with the control aim of readjusting the flow control device 4 such that it always generates the first synchronization signal 14, which indicates the start of reception frame, at the times at which exactly 76 800 samples, corresponding to one transmission frame, have been output from the sampling rate conversion device 1 since the first synchronization signal 14 last appeared. As control element, the time control signal 13 is used to reprogram the time offset for the flow control device 4.

If the control equilibrium for the control loops (A) is disturbed, e.g. by virtue of the reference signal for the chosen reference base station or the propagation path chosen as reference drifting, for example on account of the Doppler effect, i.e. on account of a disturbance acting on the arrangement, then the correlation receiver 22 first of all detects a shift/drift in the signal content and prompts the signal content to be compressed or expanded over time by virtue of the conversion ratio of the sampling rate conversion device 1 being altered until the signal content is at the original position again. This change also entails a change in the frequency with which the validity signal 9 appears, since the sampling pattern for the samples of the output signal 8 is changed. This automatically results in the flow control device 4 being readjusted to the altered timing by means of the control loops (B). Advantageously, the arrangement thus automatically couples the independently operating controllers (A) and (B) to one another, since the sampling rate conversion device 1 acts on the output signal 8 and on the validity signal 9 equally. The control loop (A) may accordingly be regarded as a primary control loop, and the control loop (B) may be regarded as a secondary or servo control loop.

The data capture device 20, i.e. the correlation receiver 22 and the correlator 25, can ascertain the position of characteristic signal contents independently of time solely through index or address calculation and is thus independent of when this ascertainment is performed. As a result, the data capture device 20 is independent of special UMTS-specific clock frequencies and is also independent in the choice of time at which the calculations are started, and independent of the speed at which the calculations are performed. Only the real-time condition that, on average, the processing speed needs to match the flow of signals must be observed.

Conversely, the sample counting device 21, i.e. the first sample counter 24 and the second sample counter 27, can ascertain the position of the first synchronization signal 14 and of the second synchronization signal 28 in time independently of the evaluation of the signal content in the data capture device 20.

The control loops described are coupled to one another, but each control loop has its own set of nominal/actual values and an actuating element to allow independent control. The coupling is implemented by coupling the output signal 8 from the sampling rate conversion device 1, i.e. the data path, to the validity signal 9 from the sampling rate conversion device 1, i.e. the control path. During activity in the control loop A, the control path is also influenced, which means that a change also arises in the control loop B, which automatically compensates for this change.

The inventive arrangement and the inventive method readjust the observation window for a reference base station using a step size or speed which is prescribed as appropriate in the UMTS standard. If a disturbance, which may also be a command on a higher protocol layer, acts on the system and results in the reference signal being shifted within the observation window, this is first of all detected by the correlation receiver 22, since said receiver finds the correlation maximum for the reference signal at a slightly—less than one chip—shifted location, and it reports this to the computation device 3 using the first control error signal 10. Larger shifts are detected by the correlator 25, which preferably operates using a coarser pattern, e.g. half of one chip, and likewise reports this to the computation device 3 using the third control error signal 26. The first, "base station tracking" algorithm 16 then uses this information to ascertain whether, how many, when and how long corrections to the observation window need to be made, and to this end generates the control signal 30 for the flow control device 4. The flow control device 4 then prompts the conversion ratio of the sampling rate conversion device 1 to be altered at the times stipulated by the control signal 30, and notifies the sampling rate conversion device 1 of this using the sampling rate control signal 12'.

If the conversion ratio of the sampling rate conversion device 1 is raised, for example, the sampling rate conversion device 1 then outputs slightly more samples in the output signal 8 per unit time by reducing the sampling pattern. Since, for the continued signal processing, each sample represents exactly one signal portion having the duration/length of one half of a chip, the signal content is expanded for the sampling pattern. The result of this is that the observed characteristic signal content of the reference signal migrates back into the center of the observation window. The correlation receiver 22 and the correlator 25 then report back to the computation device 3, using the first control error signal 10 and the third control error signal 26, that the correlation maximum is back at the original location within the observation window. The control loop A1 or A2 is then back in the steady state.

Since this measure increases the output speed of the samples for a certain period, the corresponding signal portion is processed more quickly, i.e. the corresponding transmission frame is shortened in time but contains the fixed number of 76 800 samples. The flow control device 4 is not affected by this shortening by the control loop A2 and from now onward generates the synchronization signals at incorrect times if the control loop B1 or B2 does not intervene. If the shortening is more than the duration of one sampling period, the first sample counter 24 counts 76 801 samples or 76 801 times the appearance of the validity signal 9 before the next first synchronization signal 14, which indicates the start of reception frame, appears, and it reports the error of 1 to the computation device 3 using the second control error signal 11. If the shift is less than the duration of one sampling period, this is detected by the second sample counter 27 straight away, since the latter is comparing by how many clock periods of its operating clock the validity signal 9 of a particular sample is shifted for the second synchronization signal 28 associated with this sample, and likewise reports this to the computation device 3 using the fourth control error signal 29. The computation device 3 uses the second algorithm 17 and then ascertains, on the basis of this information, whether, what size of and when corrections for the time offset of the flow control device 4 need to be made, and in this regard outputs the time control signal 13 to the flow control device 4. The flow control device 4 then shifts its events by this amount to earlier times, so that during the next transmission frame the first synchronization signal 14, which indicates the start of reception frame, already appears again after 76 800 samples or the second sample counter 27 reports the original position in time for the validity signal 9 for the second reception synchronization signal 28 again. The control loop B1 or B2 is then back in the steady state.

The control by the control loop (A) is advantageously effected with a comparatively large time constant and the control by the control loop (B) is effected with a much smaller time constant relative thereto, so that, as mentioned, the control loop (B) represents a servo control loop for (A).

Although the present invention has been described above with reference to preferred exemplary embodiments, it is not limited thereto but rather may be modified in a wide variety of ways.

In particular, when detecting and determining values for readjusting a signal processing apparatus with respect to a characteristic signal content and for readjusting a flow control device in the signal processing apparatus with respect to appearance times for the characteristic signal content, it is possible to average these values in order to improve the synchronization response.

The invention claimed is:

1. An arrangement for synchronizing a signal processing apparatus with a received signal which has a characteristic signal content appearing at a position and an associated appearance time, the arrangement comprising:
    a flow control device;
    a first control loop configured to readjust the signal processing apparatus with respect to the characteristic signal content on a content basis;
    a second control loop configured to readjust the flow control device in the signal processing apparatus with respect to the times at which the characteristic signal content appears;
    wherein the first control loop and the second control loop are independently operating control loops;
    wherein the first control loop and the second control loop are coupled such that a unique association is achieved between the position of the characteristic signal content in the received signal and the associated appearance time,
    wherein the received signal has samples which are arranged at a particular distance from one another, and
    wherein the first control loop and the second control loop are coupled via a variable fractional sampling rate conversion device comprising at least a data capture device and a sample counting device configured to change the distance between the samples in the received signal on the basis of a conversion ratio to generate a converted received signal having the characteristic signal content from the received signal, said variable fractional sampling rate conversion device configured to perform time compression or expansion for signal contents so that an operating clock for the arrangement can be based on different frequencies.

2. The arrangement of claim 1 wherein the first control loop detects the characteristic signal content in the converted received signal, determines a positional error between the position of the characteristic signal content and a reference position, and controls the conversion ratio of the sampling rate conversion device on the basis of the positional error in order to match the position of the characteristic signal content in the converted received signal to the reference position.

3. The arrangement of claim 2 wherein the sampling rate conversion device indicates appearance times for the samples in the converted received signal, and wherein the second control loop detects the indicated appearance times, generates the reference position and a time reference from the detected appearance times, determines a timing error between the time reference and a piece of time information which is generated by the flow control device in the signal processing apparatus, and controls the flow control device on the basis of the timing error in order to match the flow control device to the time reference.

4. The arrangement of claim 1 wherein the first control loop includes a data capture device and a computation device.

5. The arrangement of 4 wherein the data capture device includes a correlation receiver which detects a correlation maximum within data channels.

6. The arrangement of claim 5 wherein the data capture device includes a correlator which detects synchronization information for various propagation paths for the received signal or transmission stations.

7. The arrangement of claim 4 wherein the second control loop includes a sample counting device and the computation device.

8. The arrangement of claim 7 wherein the sample counting device includes a first sample counter configured to count the frequency with which the samples in the converted received signal appear within a transmission frame, and a second sample counter configured to detect the position in time at which the samples appear with respect to an operating clock.

9. The arrangement of claim 3 wherein the time information indicates the appearance of a sample or of a particular number of samples or both.

10. The arrangement of claim 2 wherein the reference position is the center point of a time observation window, and the signal processing apparatus is readjusted in order to keep the characteristic signal content in the center of the time observation window.

11. The arrangement of claim 7 wherein the data capture device and the sample counting device average the results therefrom.

12. The arrangement of claim 1 wherein the arrangement is used in a UMTS mobile station.

13. A method for synchronizing a signal processing apparatus having a flow control device with a received signal which has a characteristic signal content having a position and an associated appearance time, the method comprising:
- readjusting the signal processing apparatus with respect to the characteristic signal content on a content basis;
- readjusting the flow control device in the signal processing apparatus with respect to the times at which the characteristic signal content appears; and
- coupling the steps of content-based readjustment and of readjusting the flow control device such that a unique association is achieved between the position of the characteristic signal content in the received signal and the associated appearance time,
- wherein the received signal has samples which are arranged at a particular distance from one another, and in which the step of coupling comprises changing the distance between the samples in the received signal by means of a variable fractional sampling rate convention device on the basis of a conversion ratio to generate a converted received signal,
- said variable fractional sampling rate conversion device coupling a first control loop and a second control loop that are independently operating control loops, and comprising at least a data capture device and a sample counting device which are configured to perform time compression or expansion for signal contents so that an operating clock for the arrangement can be based on different frequencies.

14. The method of claim 13 wherein the of content-based readjusting step comprises: detecting the characteristic signal content in the converted received signal; determining a positional error between the position of the characteristic signal content and a reference position; and controlling the conversion ratio on the basis of the positional error in order to match the position of the characteristic signal content to the reference position.

15. The method of claim 14 further comprising indicating the times at which the samples appear in the converted received signal and wherein readjusting the flow control device step comprises: detecting the indicated appearance times; generating the reference position and a time reference from the detected appearance times; determining a timing error between the time reference and a piece of time information which is generated by the flow control device in the signal processing apparatus; and controlling the flow control device on the basis of the timing error in order to match the flow control device to the time reference.

16. The method of claim 14 further comprising averaging the detected and determined values in content-based readjusting step and the readjusting the flow control device step.

17. The method of claim 15 further comprising averaging the detected and determined values in content-based readjusting step and the readjusting the flow control device step.

* * * * *